(12) United States Patent
Good et al.

(10) Patent No.: US 9,046,660 B2
(45) Date of Patent: Jun. 2, 2015

(54) FIBER OPTIC CONNECTOR

(71) Applicant: Nexans, Paris (FR)

(72) Inventors: Paul Michael Good, Lancaster, PA (US); Greg Heffner, Denver, PA (US); William E. Ayres, III, Center Valley, PA (US)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 13/934,378

(22) Filed: Jul. 3, 2013

(65) Prior Publication Data

US 2015/0010276 A1      Jan. 8, 2015

(51) Int. Cl.
*G02B 6/38* (2006.01)

(52) U.S. Cl.
CPC ............ *G02B 6/3831* (2013.01); *G02B 6/3882* (2013.01); *G02B 6/3885* (2013.01)

(58) Field of Classification Search
CPC .................................... G02B 6/38; G02B 6/36
USPC ...................................... 385/28, 60
See application file for complete search history.

(56) References Cited

U.S. PATENT DOCUMENTS

| 6,530,696 B1 | 3/2003 | Ueda et al. |
| 2011/0229083 A1 | 9/2011 | Dainese et al. |
| 2012/0099822 A1 | 4/2012 | Kuffel et al. |

OTHER PUBLICATIONS

European Search Report dated 2014.

*Primary Examiner* — Kaveh Kianni
(74) *Attorney, Agent, or Firm* — Sofer & Haroun, LLP (57) ABSTRACT

A fiber optic connector has an opening for receiving a fiber optic cable, a pair of locating pins positioned adjacent to a front end ferrule and a housing for providing a covering between the opening and the locating pins. The locating pins are configured to be moveable between a first forward position where the locating pins extend out of the front ferrule and the housing and a second retracted position where the locating pins are retracted within the front ferrule and the housing. The locating pins are moveable from the first forward position and the second retracted position by a user via a mechanism accessible outside of the housing and without opening the housing.

5 Claims, 9 Drawing Sheets

FIGURE 1

(PRIOR ART)

Figure 2C housing hidden

Figure 2D left connector flipped

FIBER OPTIC CONNECTOR

BACKGROUND

1. Field of the Invention

The present arrangement relates to fiber optic connectors. More particularly, the present arrangement relates to fiber optic connectors with multiple pin options.

2. Description of the Related Art

Figure 1:
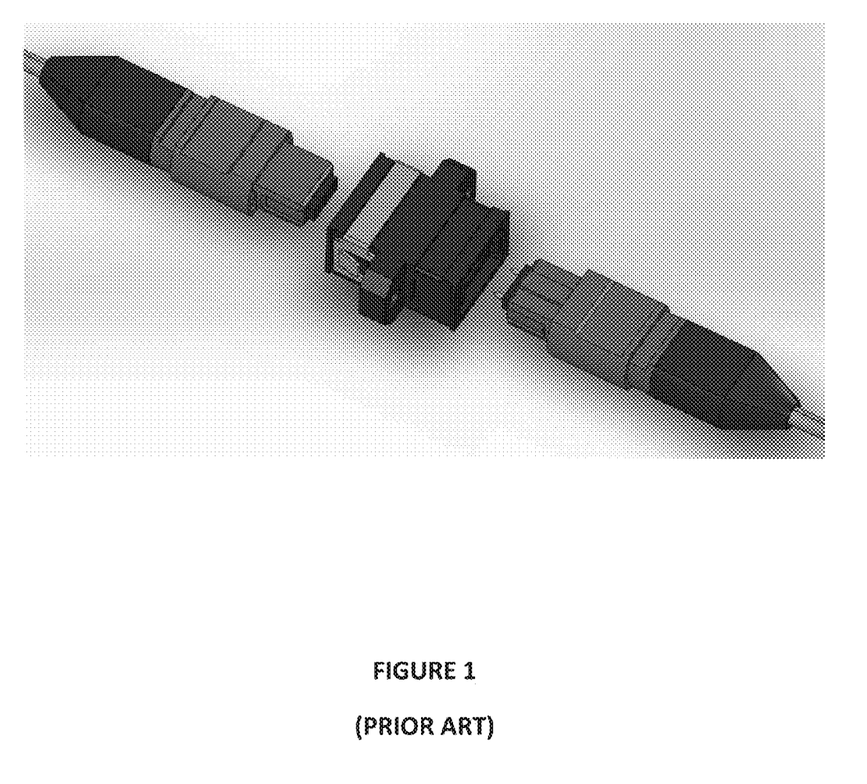
FIG. 1 is a prior art fiber optic connector.

Fiber optic connectors used for high-speed fiber optic systems often house multiple fiber optic members within the same connector body. In such cases, precise alignment of the fibers from one cable to another is accomplished within the connector bodies via locator pins. This arrangement requires that one connector on a first fiber optic cable have pins (a "male" connector) and the other connector for the other cable to have holes to accept such pins (a "female" connector). See for example prior art FIG. 1, showing a typical male and female connector arrangement with a typical adapter.

This prior art arrangement often results in cable configurations, particularly in larger multi-cable installations, with cables and cords with pre-attached connectors installed such that they cannot be mated together due to an incorrect male/female alignment. For example, if an installer has a set of fiber optic cables with a male connector on one end and a female connector on the other, and then uses such cables at an installation having male connector ports (requiring the female connector), the free end of the cables will have a male connector. If later, the open male connector end needs to be attached to a male connector port on other devices, the installer would either have to manually change the open end connector to a female connector or replace the cable with a compatible arrangement. Consequently, installers and end users must carry a large inventory of pre-terminated cables/connectors or must take extra time manipulating the available cables, with particular male or female connectors. This increases the amount of cables they must carry as well as the time it takes to complete an installation.

In other prior art arrangements, connectors may be configured to allow for pins to be added or removed as necessary. However, the adding and removing of pins requires significant manual effort including opening of the connector housing, and is thus time consuming and if not done carefully, results in damage to the fiber optic members within the connector.

OBJECTS AND SUMMARY

The present arrangement overcomes the drawbacks associated with the prior art and provides for a universal fiber connector that has both male and female connection ability. In a male configuration, the universal connector has pins in a forward extended position. In a female configuration, the same universal connector has the pins withdrawn within the housing leaving openings for accepting male pins from another connector.

To this end the present arrangement is directed to a fiber optic connector having an opening for receiving a fiber optic cable, a pair of locating pins positioned adjacent to a front end ferrule and a housing for providing a covering between the opening and the locating pins.

The locating pins are configured to be moveable between a first forward position where the locating pins extend out of the front ferrule and the housing and a second retracted position where the locating pins are retracted within the front ferrule and the housing. The locating pins are moveable from the first forward position and the second retracted position by a user via a mechanism accessible outside of the housing and without opening the housing.

BRIEF DESCRIPTION OF THE DRAWINGS

The present invention can be best understood through the following description and accompanying drawings, wherein.

DETAILED DESCRIPTION

Figure 2A:
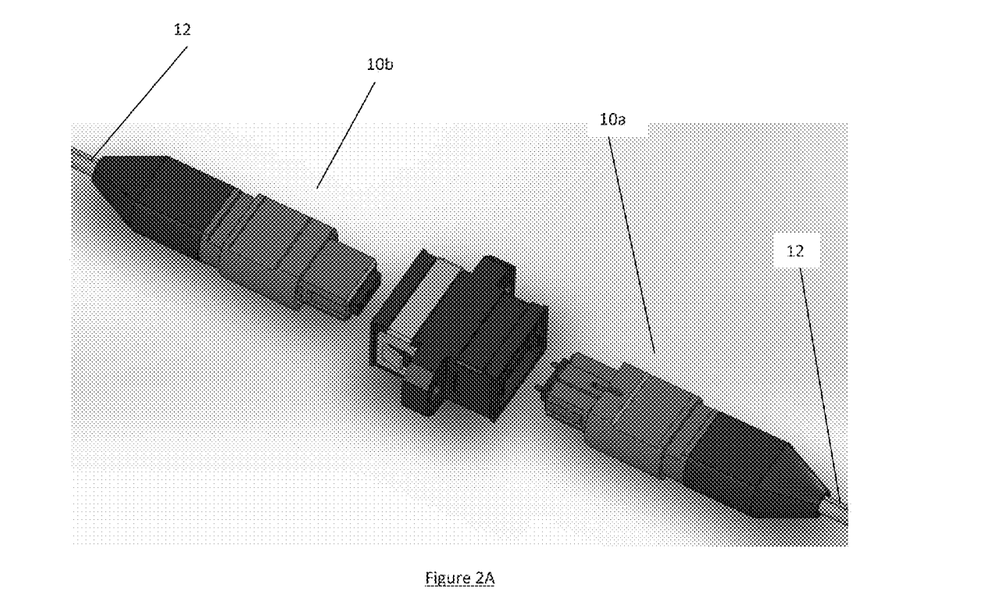
FIGS. 2a-2d are schematic showing two universal connectors attached to two fiber optic cables, in accordance with one embodiment.
Figure 2B:
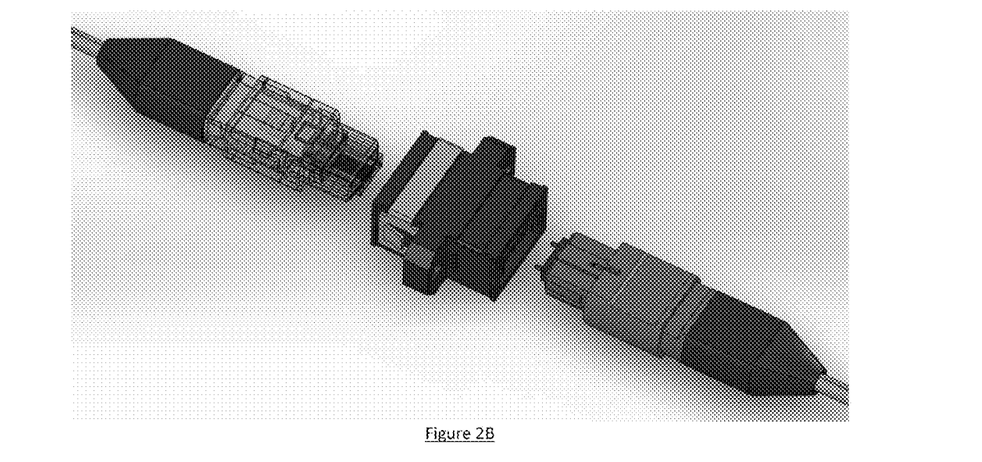
Figure 2C:
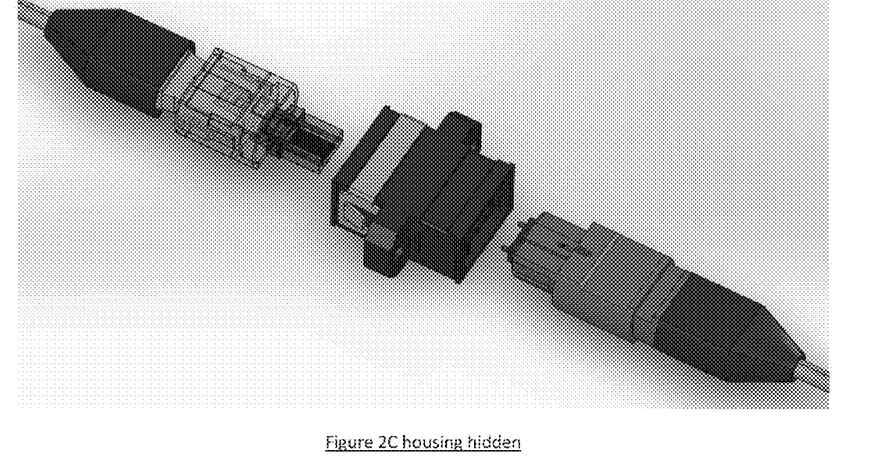
Figure 2D:
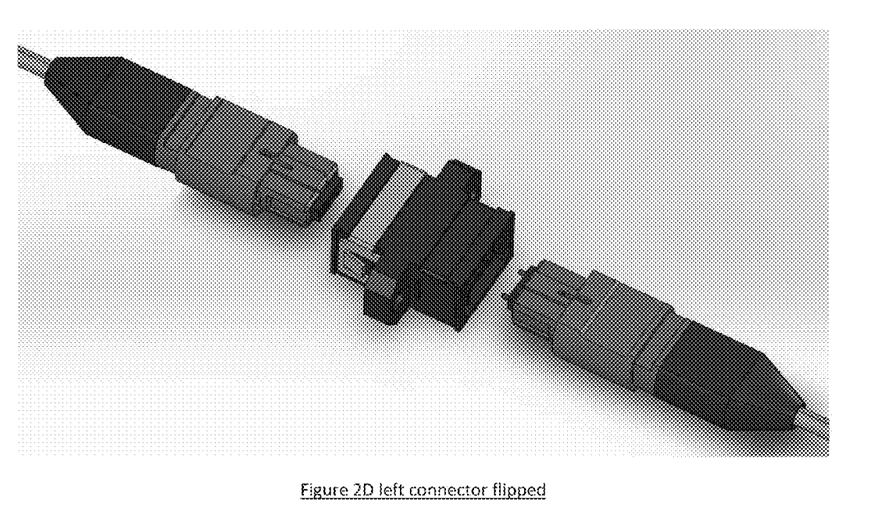

In one embodiment of the present arrangement as shown in schematic FIGS. 2a-2d, two universal fiber optic connectors 10a and 10b are shown, each connected to respective fiber optic cables 12, and to each other via a typical adapter. The illustrated connectors 10a may be arranged in a male configuration, locating pins forward, with the opposing connector 10b arranged in a female configuration, locating pins retracted, as explained in more detail below. As shown, connectors 10a and 10b are very similar in shape and size to the prior art connectors as shown in FIG. 1 as reverse compatibility with existing non-convertible connectors is intended, such as those constructed according to IEC 61754 and TIA 604-5 type MPO. Never the less, a retractable locating pins mechanism can be seen on the top of connectors 10a and 10b of FIG. 2, with such feature being described in more detail below It is noted that in FIG. 2A right connector 10a is the same as left connector 10b, but because the manner in which such connectors couple via the center adapter left connector 10b is inverted and thus the tab (explained in more detail below) on the housing is not visible. FIG. 2b-2d show various additional views of FIG. 2A, including left connector 10b with a transparent housing (FIG. 2B), left connector 10b with the housing removed (FIG. 2C), and left connector 10b inverted to show retraction tab prior to being flipped for insertion into the adapter (FIG. 2D).

It is understood, that although the specification may show certain situations where two universal connectors 10a and 10b, herein after collectively referred to as connector 10, are connected to one another, it is equally contemplated that such a universal connector 10 may be set to either male or female configuration to attach to an existing male or female standard type connector (i.e. with a fixed male or female configuration).

As illustrated throughout, connector 10 is a multi-fiber arrangement and connector 10 is shown as an MPO (multi-fiber push on/pull off) for illustration purposes. However, it is contemplated that a similar convertible connector may be applied to other connector arrangements designs such as single fiber SC (Standard Connector), LC (Lucent Connector) or FC (Ferrule Connector), if applicable with appropriate structural changes for such designs as necessary.

Figures 3A, 3B:
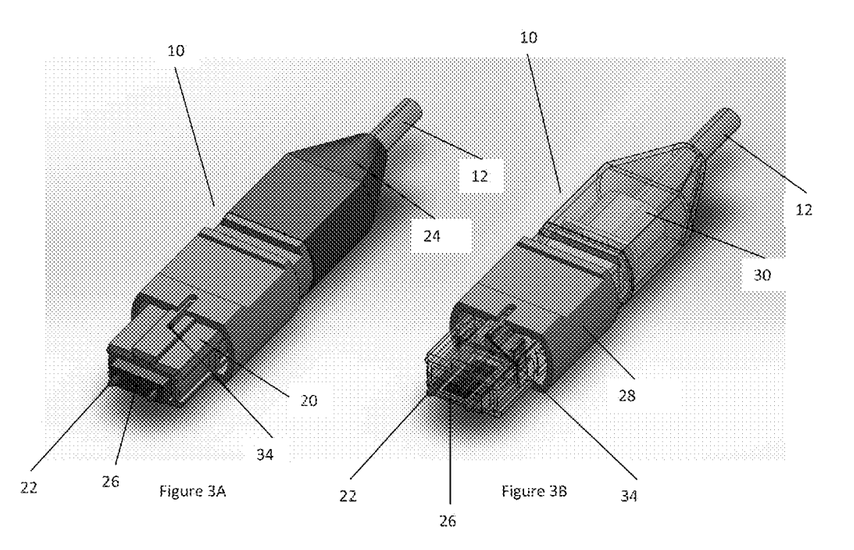
FIG. 3A is a perspective view of a universal connector, in accordance with one embodiment.
FIG. 3B is a perspective view of a universal connector in cut-away, in accordance with one embodiment.

Turning to the structure of universal connector 10, FIGS. 3A and 3B illustrate connector 10 in a complete (3A) and partial cut away (36) view. As shown in FIG. 3A, connector 10 has a housing 20, two locating pins 22 and a strain relief 24 for fiber cable 12. As shown in FIG. 3A, locating pins 22 are in the forward male position. As shown in cut-away FIG. 3B, locating pins 22 are located inside a front end ferrule 26 of connector 10. Housing 20 is fitted with a quick disconnect 28 which is designed to be slid back away from the front of the connector during disconnection procedures. Housing 20 also has a fiber opening 30 near strain relief 24 for protecting fiber element 12.

Figures 4A, 4B, 4C:
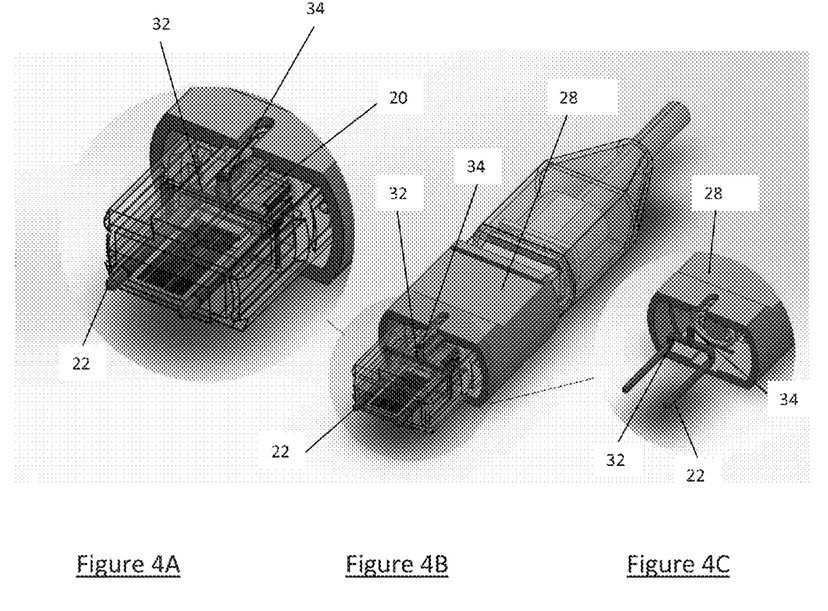
FIGS. 4A-4C show expanded perspective views of the cut-away view of the connector in FIG. 3B, in accordance with one embodiment.

FIGS. 4A-4C show perspective close up views of the partial cut away view of FIG. 3B and illustrate various components of connector 10 in more visual detail. As shown in FIG. 4C, a retraction tab 34 is provided which connects to the back of pins 22 at a connection point (denoted by point 32). Retraction tab 34 extends through housing 20. The sliding movement of retraction tab 34 allows pins 22 to extend and retract out of and into ferrule 26 respectively. FIGS. 4A-4C show how such retraction tab 34 couples with pins 22, such that the top user accessible portion of tab 34 is visible in all views of connector 10, such as illustrated in FIGS. 2A and 3A etc. . . . In one embodiment, pins 22 travel within ferrule 26 via hollow cylindrical cavities, however, other accommodating arrangements for movable pins 22 may be employed.

Figure 5:
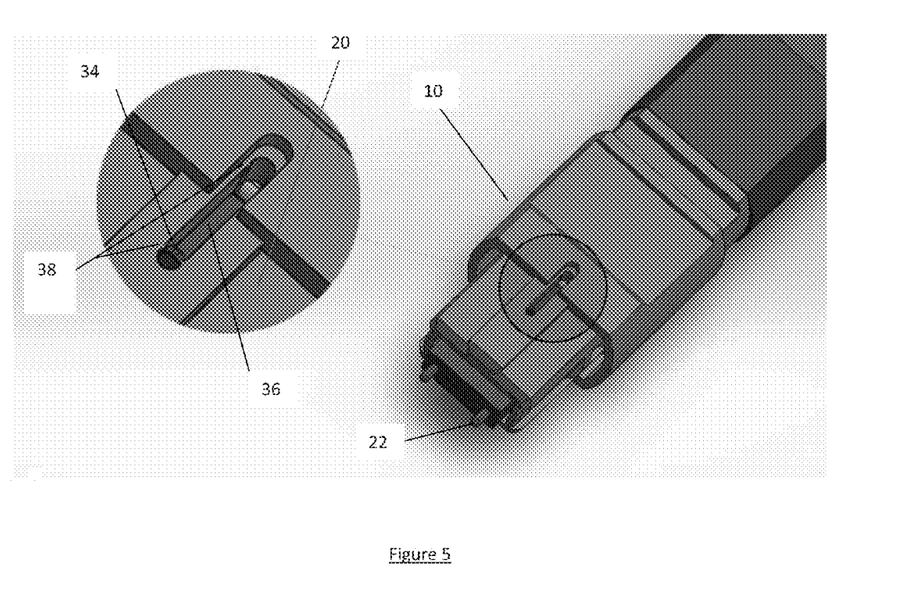
FIG. 5 is a perspective view of a universal connector in a forward male configuration, in accordance with one embodiment.

FIG. 5 provides a close up view illustrating retraction tab 34 on the outside of housing 20. Tab 34 may be configured to be nested into guide slot 36 on the surface of housing 20 to allow for the forward and backward movement of tab 34. As shown, FIG. 5 illustrates connector 10 with alignment pins 22 and corresponding tab 34 in the forward male position. In one exemplary embodiment, to ensure that pins remain in the forward (male) or retracted (female) position, tab 34 may snap into place via a snap-fit locking mechanism 38 either forward, pins extended, or backward, pins retracted. Snap fit locking mechanism 38, in one exemplary embodiment, is simply two deformable plastic projections near the ends of guide slot 36 that slightly deform to allow tab 34 to move past but retain tab 34 in position (retracted or forward) until a user applies pressure against tab 34 to move past locking mechanism 38 to switch the configuration.

Figure 6:
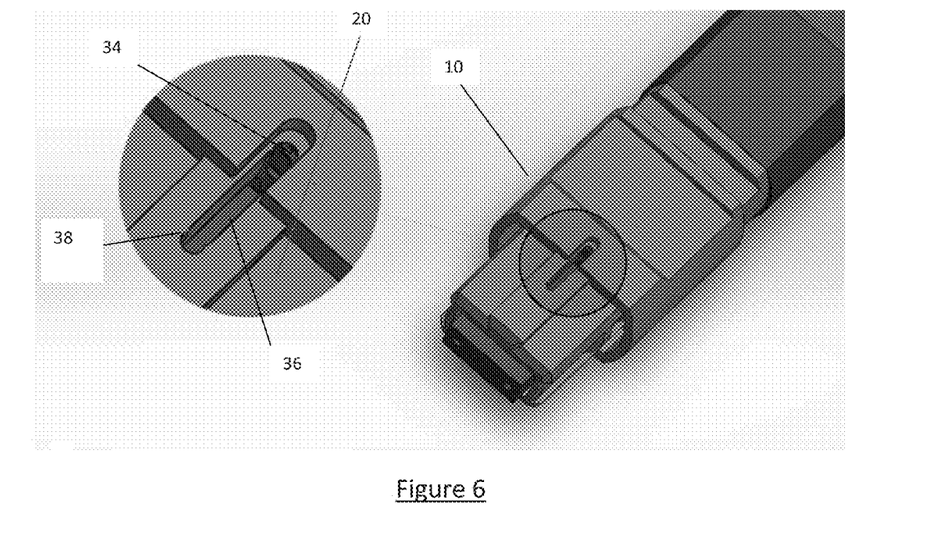
FIG. 6 is a perspective view of a universal connector in a retracted female configuration, in accordance with one embodiment.

FIG. 6, is the same as FIG. 5, but with pins 22 and tab 34 in the retracted female position. In one embodiment, an optional dust cap or cover (not shown) may be placed over guide slot 36. Such an arrangement provides a connector 10 that allows for locating pins 22 to be extended (FIG. 5) or retracted (FIG. 6) as required without disassembling the connector housing 20. When connector 10 is attached to an existing female connector, locating pins 22 are in a fixed outward male position (FIG. 5) or if the same connector 10 is attached to an existing male connector, locating pins 22 are alternatively retracted (FIG. 6) back inside housing 20 using tab 34.

Figures 7A, 7B:
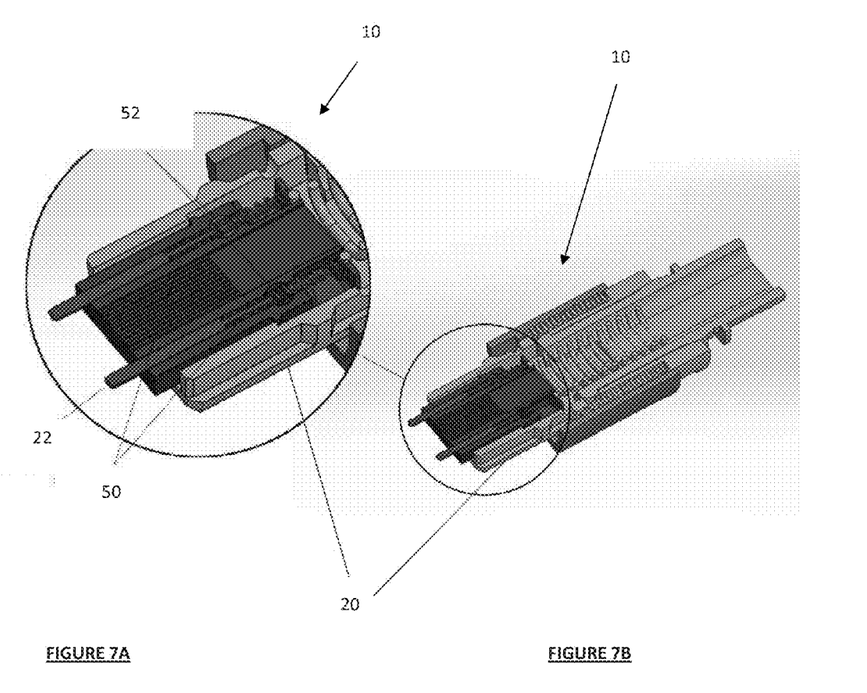
FIG. 7A is a perspective view of a universal connector in cut-away, in accordance with another embodiment.
FIG. 7B is a perspective view of a universal connector in cut-away, in accordance with another embodiment.

In another embodiment shown in FIGS. 7A and 7B, rather than using a slide tab 34, locating pins 22 are retracted and pressed forward using a spring/bias mechanism 50 located at the back of each of locating pins 22. Pin lock 52 is arranged near pin springs 50 and allows locating pins 22 to be retained in a retracted female position retained in an extended male position.

For example, in a default position, springs 50 may act to bias locating pins 22 in a forward male position. When connector 10 is needed to be configured in a female retracted position, locating pins 22 are pushed inward against springs 50 and held in the retracted position by lock 52. Pins 22 may be released from lock 52 and again biased forward to the male position, by releasing lock 52 by pressing gently inward on locating pins 22, similar to a spring mechanism in a pen.

Figure 7C:
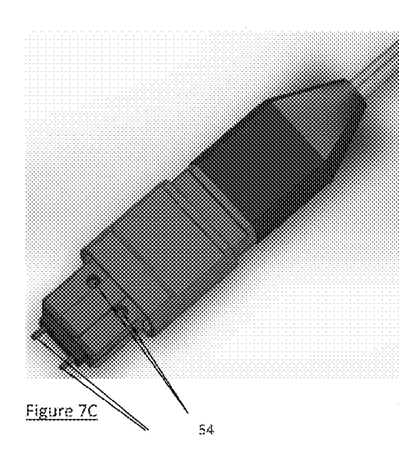
FIG. 7C-7E are additional view of the universal connector of FIGS. 7A and 7B, in accordance with another embodiment.
Figure 7D:
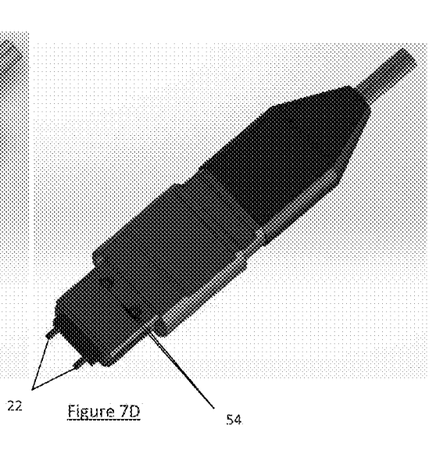
Figure 7E:
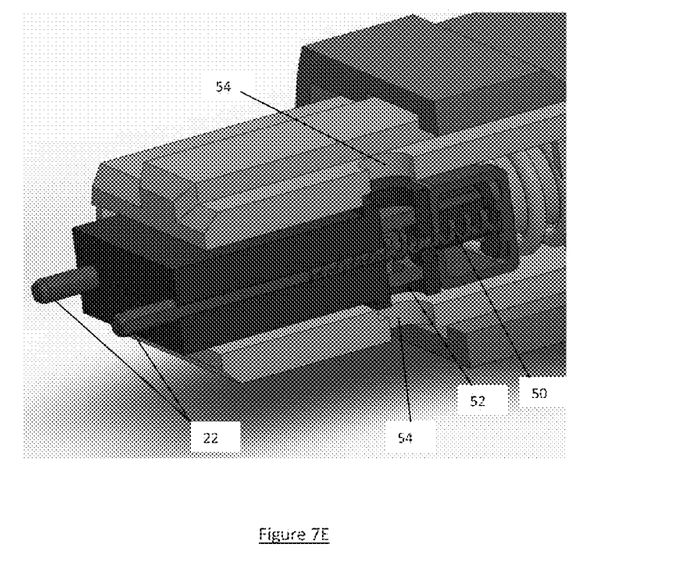

In one embodiment as shown FIGS. 7C-7E, regarding moving pins 22 forward and backward, optional access holes 54 may be placed in housing 20 to access pin lock 52. For example, pins 22, engaged in a forward male position from a first connector and locked via pin lock 52 may be used to press pins 22 in another connector 10 back into the female retracted position against spring 50, until locked by pin lock 52. In order to release pins 22 from lock 52, another pin 22 or tool may be inserted into opening 54 to disengage lock 52 allowing spring 50 to bias pins 22 back out to the male forward configuration.

While only certain features of the invention have been illustrated and described herein, many modifications, substitutions, changes or equivalents will now occur to those skilled in the art. It is therefore, to be understood that this application is intended to cover all such modifications and changes that fail within the true spirit of the invention.

What is claimed is:

1. A fiber optic connector comprising:
an opening for receiving a fiber optic cable;
a pair of locating pins positioned adjacent to a front end ferrule; and
a housing for providing a covering between said opening and said locating pins,
wherein said locating pins are configured to be moveable between a first forward position where said locating pins extend out of the front ferrule and said housing and a second retracted position where said locating pins are retracted within the front ferrule and said housing, and
wherein said locating pins are moveable from said first forward position and said second retracted position by a user via a retraction tab accessible outside of said housing and without opening said housing
wherein said retraction tab extends through said housing to an outside surface of said housing and is slidable within a guide slot in said housing so that said retraction tab is movable forward and backward within said guide slot so as to move said locating pins to a forward or retracted position respectively, and
wherein said guide slot maintains a snap-fit locking mechanism constructed as two deformable plastic projections configured to lock said retraction tab in a forward or retracted position within said guide slot.

2. The fiber optic connector as claimed in claim 1, wherein said connector has a strain relief corresponding to said opening for receiving said fiber optic cable.

3. The fiber optic connector as claimed in claim 1, wherein said housing further comprises a quick disconnect at the rear end of said fiber optic connector near said opening for receiving a fiber optic cable, said quick disconnect configured to slide back from a front end of said housing during a disconnect procedure.

4. The fiber optic connector as claimed in claim 1, wherein said locating pins are coupled to a spring biasing mechanism configured to press said locating pins into said first forward position where said locating pins extend out of the front ferrule and said housing.

5. The fiber optic connector as claimed in claim 4, wherein said locating pins are configured to be pressed inward against said spring biasing mechanism into a retracted temporary locked position placing said locating pins in a second retracted position where said locating pins are retracted within the front ferrule and said housing.

* * * * *